Patented Jan. 22, 1929.

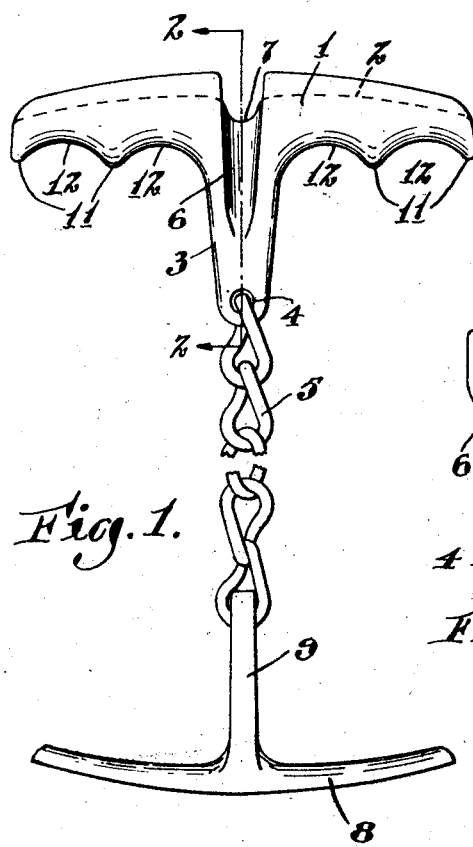
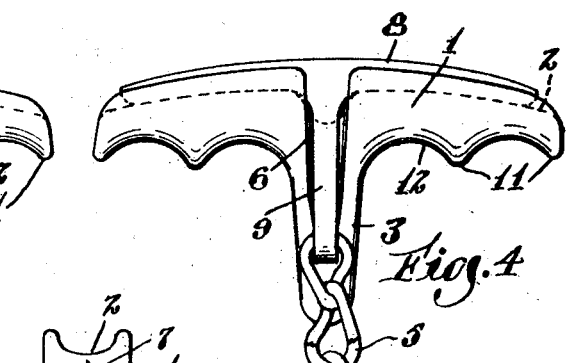
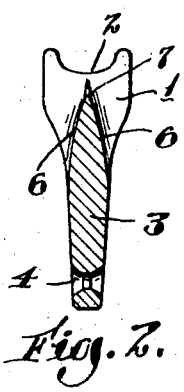
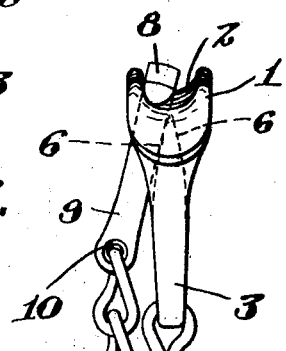
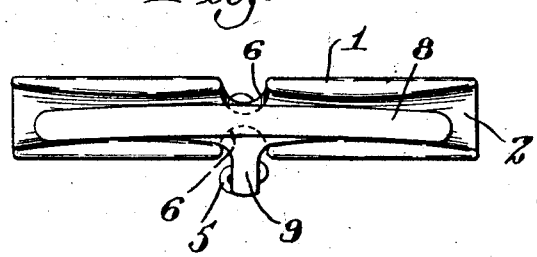

1,700,047

UNITED STATES PATENT OFFICE.

GEORGE W. HARVEY, OF MEDFORD, MASSACHUSETTS.

POLICE NIPPER.

Application filed May 12, 1927. Serial No. 190,731.

The present invention consists in the provision of a pair of nippers, or twisters, as they are commonly called, for use in police and similar work.

An important feature of the present invention is the provision of such a pair of twisters consisting of a pair of handles, substantially T-shaped, one of said handles being formed as a master handle, provided with a single trough or recess on its upper surface, to receive the other handle, which is made smaller and more compact, so that it will seat in said trough in such manner as not to interfere with the grip of the holder.

I also provide the master handle with a depending groove on each side of the handle, said groove following the stem of the master handle, which stem is continuous up to a point adjacent to but slightly below the groove. Thus the master handle is not materially weakened by the formation of these grooves, since the material of the stem of the master handle is not entirely broken away. Thus, the smaller handle can be readily snapped into the trough or recess in the top of the master handle, and from either side, thus permitting the officer or person using same to devote his entire attention to the person on whom the twisters are being utilized, without having his attention distracted by endeavoring to assemble or unite the two handles.

A further and very important feature of the present invention resides in the fact that I form the head of the master handle of considerable depth, forming thereon a plurality of ridges, said ridges defining grooves, preferably four in number, two on each side of the depending stem of the master handle. In this manner, I am enabled to make the trough or recess on the top of the master handle of considerable depth, insuring proper seating of the smaller handle therein, and at the same time the ridges and grooves above defined form a perfect hand grip for the person using these twisters, insuring firm and positive gripping of the same, and eliminating the possibility of slippage or insecure holding.

I believe that these features above outlined are novel, and I have therefore claimed the same herein.

Further features of the invention, details of construction, and combinations will be hereinafter more fully pointed out and claimed.

Referring to the drawings, illustrating a preferred embodiment of the present invention, Fig. 1 is a side elevation of my novel twisters;

Fig. 2 is a cross sectional view on the line 2—2 of Fig. 1;

Fig. 3 is an end elevation of the twisters in united or assembled relation;

Fig. 4 is a side elevation of the handles in united position; and

Fig. 5 is a top plan view of the twisters as assembled or united in Figs. 3 and 4.

As shown in the drawings, my present invention comprises a master handle 1, formed of considerable depth, and having therein, along its upper surface, a trough or recess 2. Depending from the handle 1 is a stem 3 provided adjacent to its lower end with an aperture 4, through which aperture one link of a chain 5 is fitted. Along each side of the stem 3, and depending from the trough 2, is a groove 6, the stem 3 terminating, at its upper central end at a point 7, below the bottom of the trough 2. At the other end of the chain 5 is a second and smaller handle 8, having a depending stem 9 formed with an aperture 10 to receive the link at the opposite end of the chain. When applied to the arm or leg of a person, the handle 8 can be readily snapped into assembled relation with the master handle 1, the cross bar of the handle 8 instantly seating in the trough 2, regardless to which side of the handle 1 the handle 8 is applied. The grooves 6, at the side of the stem 3, are so formed that they will permit the handle 8 and stem 9 to fit in a snug, close relation to the master handle 1. This presents a very simple construction, presenting a narrow handle, with a single trough in its upper surface, and with substantially the full strength of the depending stem 3 retained, while still affording a ready and close seating capacity of the handle 8 and stem 9 in and against the handle 1.

As heretofore explained, the master handle 1 is formed of considerable depth, being relatively much deeper than the handle 8. This enables the trough 2 to be made of substantial depth, and also permits the provision of the ridges 11, forming grooves or finger holds 12. Thus, when holding the master handle 1 in the hand, there is provided substantial material to grasp, as well as a positive gripping means, eliminating the possibility of slippage of the master handle 1. Held in this manner, the smaller handle 8 can be readily snapped into the master handle 1 when the chain has encircled the limb of the person on whom the twisters are to be used. Also, the person using the twisters can apply the smaller handle to the master handle, and can entirely disregard the side to which the smaller handle is applied, since it will fit and seat equally well on either side of the master handle.

It will thus be seen that I have devised a novel pair of twisters, one which will be efficient in action, quick in operation, and yet simple to utilize. The construction of handles above described also eliminates the possibility of pinching the skin or flesh of the user of the twisters, because of the depth of the trough 2, and the close fitting of the stem 9 in the grooves 6 and against the stem 3.

My invention is further described and defined in the form of claims as follows:

1. Police nippers of the kind described, comprising a pair of handles, a flexible element uniting the same, one of said handles being of greater thickness than the other and having but a single longitudinal trough in its upper surface, a stem depending from said handle and having a groove formed on each side thereof, the upper end of said stem terminating below the bottom of said longitudinal trough, a plurality of transverse ridges on the lower surface of the larger handle at each side of said stem, said ridges defining grooves therebetween and acting as finger gripping means.

2. Police nippers of the kind described, comprising a pair of handles, a flexible element uniting the same, one of said handles being of greater thickness than the other and having but a single longitudinal trough in its upper surface, a stem depending from said handle and having a groove formed at each side thereof, the upper end of said stem terminating below the bottom of said longitudinal trough, each end of said thicker handle terminating in a relatively sharp ridge on its under surface, and a single relatively sharp transverse ridge located between each of said end ridges and said stem, said end ridges and said transverse ridges forming two sharply defined finger gripping grooves at each side of said stem.

In testimony whereof I have signed my name to this specification.

GEORGE W. HARVEY.